United States Patent
Al-Harbi et al.

(10) Patent No.: US 11,286,187 B2
(45) Date of Patent: Mar. 29, 2022

(54) IRON SULFIDE SCALE INHIBITION IN AN OIL PRODUCTION SYSTEM

(71) Applicant: SAUDI ARABIAN OIL COMPANY, Dhahran (SA)

(72) Inventors: Bader Ghazi Al-Harbi, Dammam (SA); Norah Aljeaban, Khubar (SA)

(73) Assignee: SAUDI ARABIAN OIL COMPANY

(*) Notice: Subject to any disclaimer, the term of this patent is extended or adjusted under 35 U.S.C. 154(b) by 0 days.

(21) Appl. No.: 16/806,015

(22) Filed: Mar. 2, 2020

(65) Prior Publication Data

US 2021/0269344 A1  Sep. 2, 2021

(51) Int. Cl.
*C02F 5/10* (2006.01)
*E21B 37/06* (2006.01)
*E21B 43/22* (2006.01)
*E21B 43/26* (2006.01)
*C02F 103/10* (2006.01)

(52) U.S. Cl.
CPC .............. *C02F 5/105* (2013.01); *E21B 37/06* (2013.01); *E21B 43/26* (2013.01); *C02F 2103/10* (2013.01)

(58) Field of Classification Search
CPC ...... C09K 8/528; C09K 2208/20; E21B 37/06
See application file for complete search history.

(56) References Cited

U.S. PATENT DOCUMENTS

| | | | |
|---|---|---|---|
| 3,505,238 A | 4/1970 | Liddel et al. | |
| 3,704,750 A | 12/1972 | Miles et al. | |
| 3,827,977 A | 8/1974 | Miles et al. | |
| 3,965,027 A | 6/1976 | Boffardi et al. | |
| 4,446,028 A | 5/1984 | Becker | |
| 4,640,793 A | 2/1987 | Persinski et al. | |
| 4,898,686 A | 2/1990 | Johnson et al. | |
| 7,398,824 B1 | 7/2008 | Wang et al. | |
| 9,133,046 B2 | 9/2015 | Blokker et al. | |
| 2005/0067164 A1* | 3/2005 | Ke | C09K 8/528 166/304 |

FOREIGN PATENT DOCUMENTS

| | | |
|---|---|---|
| CA | 1318123 C | 5/1993 |
| CN | 102167450 B | 8/2011 |
| JP | 2010202893 A | 9/2010 |
| WO | 2016105381 A1 | 6/2016 |
| WO | 2016134873 A1 | 9/2016 |
| WO | 2016155967 A1 | 10/2016 |
| WO | 2018175782 A1 | 9/2018 |

OTHER PUBLICATIONS

International Search Report and Written Opinion of PCT Application No. PCT/US2021/070212 dated Jun. 22, 2021: pp. 1-11.

* cited by examiner

*Primary Examiner* — Zakiya W Bates
(74) *Attorney, Agent, or Firm* — Bracewell LLP; Constance Gall Rhebergen

(57) ABSTRACT

A methods and compositions for inhibiting iron sulfide scale in an oil production system having a well in a hydrocarbon-bearing formation. The method includes the steps of: supplying an aqueous scale-inhibiting solution comprising a water-soluble metal compound and a scale inhibitor, the water-soluble metal compound comprising a metal selected from the group consisting of lead, zinc, and combinations of the same; and wherein the scale inhibitor comprises a compound selected from the group consisting of phosphino polymers, inorganic polyphosphinates, organic phosphate esters, organic phosphonates, organic aminophosphates, polyphosphonates, polycarboxylates, and combinations of the same; and injecting the aqueous scale-inhibiting solution through the well such that iron sulfide scale is inhibited in the oil production system.

12 Claims, No Drawings

IRON SULFIDE SCALE INHIBITION IN AN OIL PRODUCTION SYSTEM

TECHNICAL FIELD

Methods and compositions for treating a well to inhibit the deposition of iron sulfide scale on perforations, casing, production tubulars, valves, pumps, and downhole completion equipment such as safety equipment and gas lift mandrels.

BACKGROUND

Downhole scale formation in oil and gas wells is a persistent problem that can block pore throats in the near-wellbore region or the well itself. Scale forms as sparingly soluble inorganic salts that can deposit on nearly any surface. Scale deposits form layers that continue to grow unless treated. Scale deposits in the near-wellbore region can damage the formation and cause a decrease in well productivity. Scale deposits can also cause equipment to malfunction and block flow anywhere along the production conduit or in processing facilities.

Conventional scale inhibitors for the inhibition of carbonates and sulfates are widely available, but they are generally ineffective at inhibiting iron sulfide scale formation. Aminocarboxylate chelates, such as nitrilotriacetic acid, have been used to sequester iron ions and prevent iron sulfide scale from forming, but their use is limited because they rapidly decompose as temperature is increased. Iron sulfide dispersants have also been developed, but are not economical because they require significant quantities of dispersant to be effective. Because iron sulfide scale formation is difficult to inhibit, it is sometimes allowed to accumulate uninhibited until enough iron sulfide scale has deposited to warrant remediation by either mechanical cleaning or acid treatment, both of which present significant problems and involve substantial costs.

SUMMARY

The methods and compositions disclosed here can effectively inhibit iron sulfide scale formation without the costs of scale remediation. The methods and compositions involve treating the near-wellbore region of a formation with an aqueous scale-inhibiting solution that includes a water-soluble metal compound and a scale inhibitor.

A method for inhibiting iron sulfide scale deposition in an oil production system having a well in a hydrocarbon-bearing formation is disclosed. The method includes supplying an aqueous scale-inhibiting solution having a water-soluble metal compound and a scale inhibitor, and injecting the aqueous scale-inhibiting solution through the well such that iron sulfide scale is inhibited in the oil production system. The water-soluble metal compound includes a metal selected from lead, zinc, or both. The scale inhibitor includes a compound selected from the following: phosphino polymers, inorganic polyphosphinates, organic phosphate esters, organic phosphonates, organic aminophosphates, polyphosphonates, polycarboxylates, and combinations of the same.

In certain aspects, the metal of the water-soluble metal compound has an oxidation number of two. In some embodiments, the metal of the water-soluble metal compound is zinc, and the water-soluble metal compound comprises a zinc compound selected from the following: zinc halides, hydrates of zinc halides, zinc acetate, zinc acetate dihydrate, and combinations of the same. In some embodiments, the metal of the water-soluble metal compound is lead, and the water-soluble metal compound comprises a lead compound selected from the group consisting of: lead halides, hydrates of lead halides, lead acetate, lead acetate dihydrate, and combinations of the same. In at least one embodiment, the scale inhibitor comprises phosphino carboxylic acid. In at least one embodiment, the scale inhibitor comprises a terpolymer of maleic acid. The scale inhibitor and the water-soluble metal compound can have a weight ratio that is between 100:1 and 2:1 scale inhibitor to water-soluble metal compound. The aqueous scale-inhibiting solution can have pH in the range of 2-8.

In some embodiments, the step of injecting the aqueous scale-inhibiting solution includes injecting the aqueous scale-inhibiting solution as a squeeze treatment into the hydrocarbon-bearing formation. In some embodiments, the step of injecting the aqueous scale-inhibiting solution includes injecting the aqueous scale-inhibiting solution as a continuous injection treatment.

The hydrocarbon-bearing formation can contain a hydrocarbon fluid (such as oil, or natural gas liquids). In some embodiments, the method is suitable for use with sour hydrocarbon fluids (that is, hydrocarbon-bearing formations containing a hydrocarbon fluid having sulfur compounds (such as hydrogen sulfide, or mercaptans, or both) in the range of 0.0004-90 volume percent).

An aqueous scale-inhibiting solution for inhibiting deposition of iron sulfide scale in an oil production system is disclosed. The aqueous scale-inhibiting solution includes a water-soluble metal compound, and a scale inhibitor. The water-soluble metal compound includes a metal selected from lead, zinc, or both. The scale inhibitor can be selected from the following group: phosphino polymers, inorganic polyphosphinates, organic phosphate esters, organic phosphonates, organic aminophosphates, polyphosphonates, polycarboxylates, and combinations of the same.

In some aspects, the metal of the aqueous scale-inhibiting solution has an oxidation number of two. In some embodiments, the metal of the water-soluble metal compound is zinc, and the water-soluble metal compound includes a zinc compound selected from the following: zinc halides, hydrates of zinc halides, zinc acetate, zinc acetate dihydrate, and combinations of the same. In some embodiments, the metal of the water-soluble metal compound is lead, and the water-soluble metal compound includes a lead compound selected from the following: lead halides, hydrates of lead halides, lead acetate, lead acetate dihydrate, and combinations of the same. In at least one embodiment, the scale inhibitor includes phosphino carboxylic acid. In at least one embodiment, the scale inhibitor includes a terpolymer of maleic acid. In some embodiments, the scale inhibitor and the water-soluble metal compound have a weight ratio that is between 100:1 and 2:1 scale inhibitor to water-soluble metal compound. The aqueous scale-inhibiting solution can have pH in the range of 2-8.

FIGURES

Not applicable.

DETAILED DESCRIPTION

While the scope of the compositions and methods will be described with several embodiments, it is understood that one of ordinary skill in the relevant art will appreciate that many examples, variations, and alterations to the composition and methods described here are within the scope and spirit of the disclosure.

Accordingly, the embodiments described are set forth without any loss of generality, and without imposing limitations on the disclosure. Those of ordinary skill in the relevant art understand that the scope includes all possible combinations and uses of particular features described in the specification.

As used in this disclosure, the term "iron sulfide scale" refers to a sparingly soluble inorganic solid having the chemical formula FeS. Iron sulfide scale forms from iron and sulfur ions in solution, and can form on nearly any solid surface.

As used in this disclosure, the term "water-soluble metal compound" refers to a chemical compound containing zinc or lead or both that yields zinc or lead ions when hydrolyzed. The term does not include sulfates, which can have a negative effect on the methods and compositions disclosed.

As used in this disclosure, the term "oil production system" refers to a system for producing oil or gas from a well. The system includes well equipment that comes into direct contact with produced water during production, and any portion of the subterranean formation that comes into direct contact with the aqueous scale-inhibiting solution. An example of an oil production system can include a well (including perforations, the near-borehole region of the rock formation around the well, casing, production tubulars, valves, pumps, and downhole equipment), conduit, storage tanks, and processing facilities.

As used in this disclosure, the term "scale inhibitor" refers to a chemical that is used to control or prevent the formation of scale deposits in an oil production system. Nonlimiting examples of chemicals used to control or prevent the formation of scale deposits include phosphino polymers, inorganic polyphosphinates, organic phosphate esters, organic phosphonates, organic aminophosphates, polyphosphonates, polycarboxylates, and combinations of the same.

As used in this disclosure, the term "aqueous scale-inhibiting solution" refers to a water-based solution that is used to control or prevent the formation of scale deposits in an oil production system. The aqueous scale-inhibiting solution disclosed here includes a scale inhibitor and a water-soluble metal compound.

Scale inhibitor treatments that include scale inhibitors and water-soluble metal compounds of zinc or lead or both can have the synergistic effect of inhibiting iron sulfide scale along with other scale (such as calcite, aragonite, gypsum, barite, celestite, halite, zinc sulfide, and lead sulfide). By way of example and not limitation, iron sulfide scale can form in the presence of hydrogen sulfide as shown in Eqn. 1.

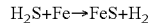

$$H_2S + Fe \rightarrow FeS + H_2 \quad \text{Eqn. 1}$$

The treatments disclosed here are particularly suitable for use in the presence of elevated concentrations of sulfur compounds, such as hydrogen sulfide and mercaptans. Not intending to be limited by any particular technical theory, it is believed that the presence of zinc (II) or lead (II) ions with a scale inhibitor can inhibit the formation of zinc sulfide (ZnS) or lead sulfide (PbS) particles which serve as seed for the formation of iron sulfide.

Advantageously, the aqueous scale-inhibiting solutions disclosed here can enhance the effectiveness of scale treatments by delaying or preventing the formation and deposition of iron sulfide scale in addition to other scale. The aqueous scale-inhibiting solutions can be tailored for individual well conditions and circumstances. For example, the aqueous scale-inhibiting solutions can be resistant to decomposition at elevated temperatures. In certain aspects, the aqueous scale-inhibiting solutions can be operable under acidic conditions or basic conditions or both. Moreover, the water-soluble metal compounds can be provided in the form of metal halides or metal acetates; some of which are readily available and inexpensive.

The aqueous scale-inhibiting solution disclosed here is a water-based solution that includes a scale inhibitor and a water-soluble metal compound. The scale inhibitor can include a conventional scale inhibitor for controlling any combination of carbonate scale, sulfate scale, halite, zinc sulfide, or lead sulfide. The scale inhibitor can be Nonlimiting examples of suitable scale inhibitors include phosphino polymers, inorganic polyphosphinates, organic phosphate esters, organic phosphonates, organic aminophosphates, polyphosphates, polyphosphonates, polycarboxylates, and combinations of the same. Polymers are particularly suitable for inhibiting nucleation and slowing scale growth. Copolymers and terpolymers having carboxylic, phosphonic acid, sulfonic acid groups, or their combinations can also be used. A nonlimiting example of a suitable scale inhibitor is polyphosphinocarboxylic acid (PPCA), which has a phosphino group bonded to two polyacrylic or polymaleic chains. Another nonlimiting example of a suitable scale inhibitor is diethylenetriaminepentakis(methylenephosphonic acid) (DTPMP), which is widely used for controlling carbonate and sulfate scale. Other nonlimiting examples of suitable scale inhibitors include terpolymers of maleic acid, aminotris(methylenephosphonic acid) (ATMP), 1,2-diaminoethanetetrakis(methylenephosphonic acid) (EDTMP), and 1-hydroxyethane-1,1-diphosphonic acid (HEDP).

The water-soluble metal compound can include a chemical compound containing metal selected from zinc or lead or both that yields zinc or lead ions when hydrolyzed. The metal in the water-soluble metal compound can have an oxidation number of 2. In some embodiments the water-soluble metal compounds can include metal (that is, zinc or lead) halides, hydrates of metal halides, metal acetate, metal acetate dihydrate, and combinations of the same. Metal halides are ionic compounds having zinc or lead and at least one halogen (that is, group 17 element). Nonlimiting examples of suitable metal halides include zinc chloride ($ZnCl_2$), lead chloride ($PbCl_2$), zinc bromide ($ZnBr_2$), and lead bromide ($PbBr_2$). However, zinc or lead sulfates are not suitable because their presence may result in the precipitation of other scales such as barium sulfate and calcium sulfate.

The aqueous scale-inhibiting solution can have a weight ratio of scale inhibitor to zinc (II) ions or lead (II) ions or both that is in the range of about 100:1 to about 2:1. In at least one embodiment the aqueous scale-inhibiting solution has a ratio of scale inhibitor to zinc (II) ions or lead (II) ions or both that is about 20:3.

The aqueous scale-inhibiting solution can have a concentration of zinc (II) ions in the range of 1-200 milligrams per L (mg/L), a concentration of lead (II) ions in the range of 1-50 mg/L, or both. In at least one embodiment the aqueous scale-inhibiting solution can have a concentration of zinc (II) or lead (II) ions that is about 15 parts-per-million by mass (ppmw).

The pH of the aqueous scale-inhibiting solution can vary depending on the scale inhibitor and formation characteristics. Metal hydroxides (such as iron hydroxide, zinc hydroxide, and lead hydroxide) may precipitate in solutions having a pH above 8. In some embodiments the aqueous scale-inhibiting solution can have pH in the range of about 2-8.

The aqueous scale-inhibiting solution can be used at a broad range of temperatures. The type of scale inhibitor will determine the suitability of particular temperature ranges. In some embodiments the aqueous scale-inhibiting solution can be used at temperatures up to about 180° C.

A method for treating a formation with the aqueous scale-inhibiting solution to delay or prevent the formation and deposition of iron sulfide scale is provided here. The method includes supplying the aqueous scale-inhibiting solution, and injecting the aqueous scale-inhibiting solution through the well into the formation. The treatment can be accomplished by a squeeze treatment or continuous injection. The aqueous scale-inhibiting solution can also be integrated with fracture treatments provided that the scale inhibitor and zinc or lead ions are compatible with fracturing treatment additives selected for the particular application.

In a squeeze treatment the aqueous scale-inhibiting solution is injected into the formation by pumping the solution through the well into the formation, where it is pushed into the pores of the rock in the near-wellbore region of the formation. After injecting the aqueous scale-inhibiting solution, the well is typically shut-in for a period of time to allow the chemicals of the aqueous scale-inhibiting solution to be retained by various mechanisms (such as adsorption or precipitation). The period of time that the well is shut-in can be between about one hour and about 36 hours, alternately between about three hours and about 24 hours. Following the shut-in period, the well is brought on-stream and the retained chemicals from the aqueous scale-inhibiting solution are gradually released. The scale-inhibiting effect of the aqueous scale-inhibiting solution is observed wherever the chemicals are present in sufficient concentrations; that is, wherever the concentration of chemicals from the scale-inhibiting solution exceeds the minimum inhibitor concentration that prevents scale deposition. The concentration of chemicals from the aqueous scale-inhibiting solution in produced water is monitored; and when it falls below the minimum inhibitor concentration, a new squeeze treatment can be carried out.

In embodiments where the aqueous scale-inhibiting solution is injected by a squeeze treatment, the oil production system can include the well (including perforations, casing, production tubulars, valves, pumps, downhole equipment, etc.), and the near-borehole region of the rock formation around the well perforations. In some embodiments the oil production system can also include conduit, storage tanks, and processing facilities.

In a continuous injection treatment the aqueous scale-inhibiting solution is continuously injected at the wellhead or into the well through a tubing that extends to a downhole injection point. In some aspects, the aqueous scale-inhibiting solution can be continuously injected via a capillary string. In some aspects, the aqueous scale-inhibiting solution can be continuously injected via a gas lift injection system. Continuous injection of the aqueous scale-inhibiting solution at the wellhead may be particularly suitable for produced water reinjection at an injection well. In some aspects, the aqueous scale-inhibiting solution can be combined with a corrosion inhibitor.

In some embodiments where the aqueous scale-inhibiting solution is continuously injected into the well, the oil production system can include the well (including perforations, casing, production tubulars, valves, pumps, downhole equipment, etc.). In some embodiments the oil production system can include an injection well, a production well, and the region of the formation between the injection well and the production well. In some embodiments, the oil production system can also include conduit, storage tanks, and processing facilities.

EXAMPLES

The following examples are included to demonstrate embodiments of the disclosure, and should be considered nonlimiting. The techniques and compositions disclosed in the examples which follow represent techniques and compositions discovered to function well in the practice of the disclosure, and thus can be considered to constitute modes for its practice. However, changes can be made to the embodiments disclosed in the examples without departing from the spirit and scope of the disclosure.

Example 1

Two aqueous supernatant solutions are prepared having a concentration of iron that is about 100 ppmw and concentrations of PPCA that are about 100 ppmw and 200 ppmw respectively. About 30 ppmw hydrogen sulfide ($H_2S$) is added and mixed with each aqueous supernatant solution. Within two hours the iron concentration is decreased from about 100 ppmw to about 60 ppmw and 64 ppmw respectively due to iron sulfide scale formation; demonstrating that PPCA alone is a poor inhibitor of iron sulfide scale formation.

The procedure is repeated with zinc (II) ions and compared. An aqueous supernatant solution is prepared having a concentration of iron that is about 100 ppmw, a concentration of PPCA that is about 100 ppmw, and a concentration of zinc (II) that is about 15 ppmw. After two hours the concentration of iron is decreased by only about 3 ppmw due to iron sulfide scale formation; demonstrating that the combination of PPCA with zinc (II) ions is suitable for inhibiting the formation of iron sulfide scale.

Example 2

An aqueous scale-inhibiting solution is prepared having a concentration of PPCA that is about 100 ppmw and a concentration of zinc (II) that is about 15 ppmw. The aqueous scale-inhibiting solution is injected as a squeeze treatment into a hydrocarbon-bearing formation having a concentration or about 30 ppmw hydrogen sulfide. The well is shut-in for a period of about twelve hours. After the shut-in period, the well is brought on-stream and the deposition of iron sulfide scale is inhibited. The concentration of the scale inhibitor is monitored. Additional squeeze treatments are administered as the concentration of the scale inhibitor approaches the minimum inhibitor concentration that prevents scale deposition.

We claim:

1. A method for inhibiting iron sulfide scale in an oil production system having a well in a hydrocarbon-bearing formation, the method comprising the steps of:
   supplying an aqueous scale-inhibiting solution comprising a water-soluble metal compound and a scale inhibitor, the water-soluble metal compound comprising a metal selected from the group consisting of lead, zinc, and combinations of the same; and wherein the scale inhibitor comprises a compound selected from the group consisting of phosphino polymers, inorganic polyphosphinates, organic phosphate esters, organic phosphonates, organic aminophosphates, polyphosphonates, polycarboxylates, and combinations of the same, wherein the scale inhibitor and the water-soluble metal compound have a weight ratio that is between 100:1 to 40:1 scale inhibitor to water-soluble metal compound; and injecting the aqueous scale-inhibiting solution through the well such that iron sulfide scale is prevented from forming in the oil production system.

2. The method of claim 1, wherein the metal of the water-soluble metal compound has an oxidation number of 2.

3. The method of claim 2, wherein the metal of the water-soluble metal compound is zinc, and the water-soluble metal compound comprises a zinc compound selected from the group consisting of zinc halides, hydrates of zinc halides, zinc acetate, zinc acetate dihydrate, and combinations of the same.

4. The method of claim 2, wherein the metal of the water-soluble metal compound is lead, and the water-soluble metal compound comprises a lead compound selected from the group consisting of lead halides, hydrates of lead halides, lead acetate, lead acetate dihydrate, and combinations of the same.

5. The method of claim 1, wherein the scale inhibitor comprises phosphino carboxylic acid.

6. The method of claim 1, wherein the scale inhibitor comprises a terpolymer of maleic acid.

7. The method of claim 1, wherein the aqueous scale-inhibiting solution has pH in the range of 2-8.

8. The method of claim 1, wherein the step of injecting the aqueous scale-inhibiting solution comprises injecting the aqueous scale-inhibiting solution as a squeeze treatment into the hydrocarbon-bearing formation.

9. The method of claim 1, wherein the step of injecting the aqueous scale-inhibiting solution into the well comprises injecting the aqueous scale-inhibiting solution as a continuous injection treatment.

10. The method of claim 1, wherein the hydrocarbon-bearing formation contains a hydrocarbon fluid; and where the hydrocarbon fluid comprises sulfur compounds in the range of 0.0004-90 volume percent; and where the sulfur compounds are selected from the group consisting of hydrogen sulfide, mercaptans, and combinations of the same.

11. The method of claim 1, wherein the scale inhibitor and the water-soluble metal compound have a weight ratio that is 100:1 scale inhibitor to water-soluble metal compound.

12. The method of claim 1, wherein the water-soluble metal compound comprises a metal selected from the group consisting of zinc halides, hydrates of zinc halides, lead halides, hydrates of lead halides, and combinations of the same.

* * * * *